(No Model.) 2 Sheets—Sheet 1.
J. PORTER.
PIPE CUTTER.
No. 492,833. Patented Mar. 7, 1893.
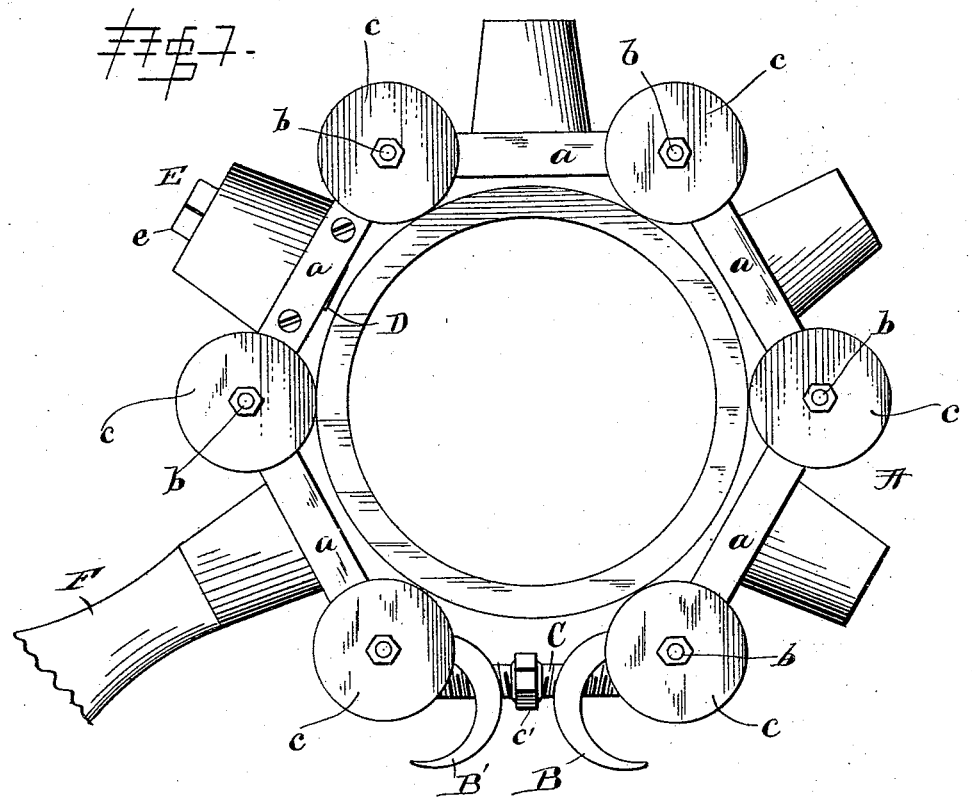
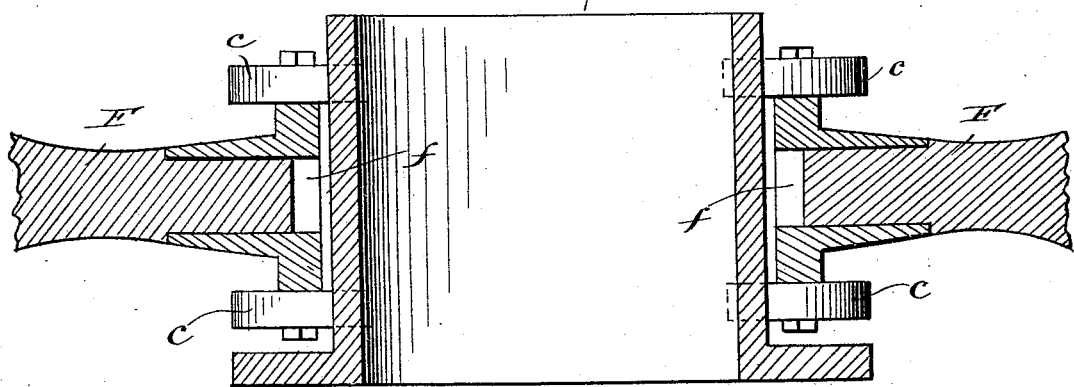
WITNESSES
INVENTOR (No Model.) 2 Sheets—Sheet 2.
J. PORTER.
PIPE CUTTER.
No. 492,833. Patented Mar. 7, 1893.
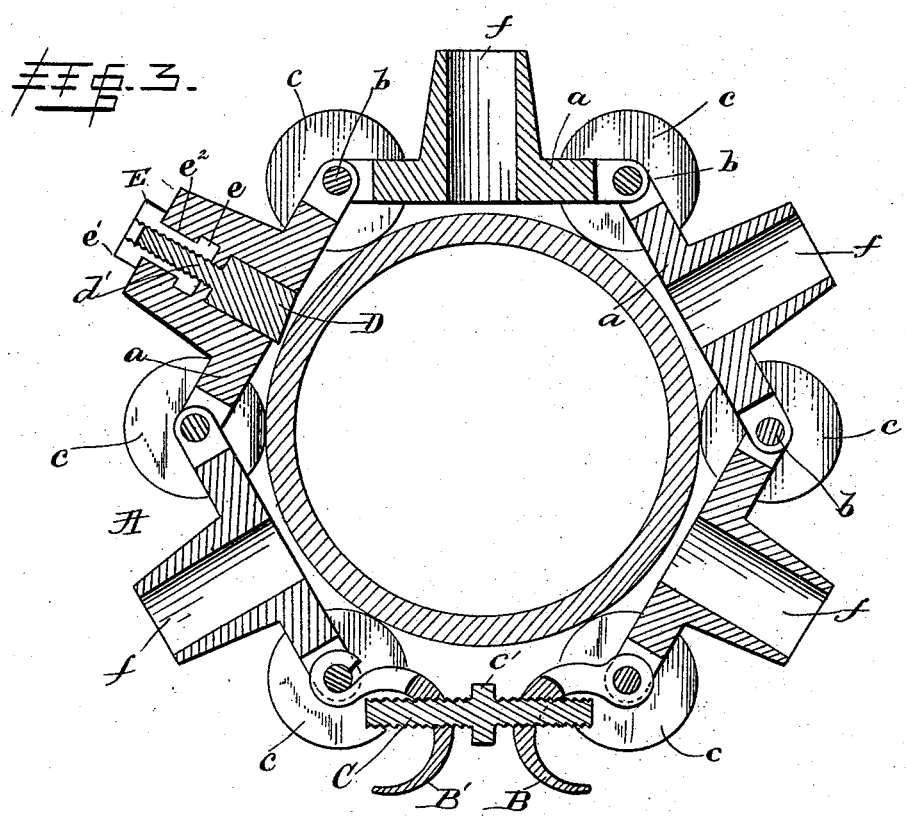
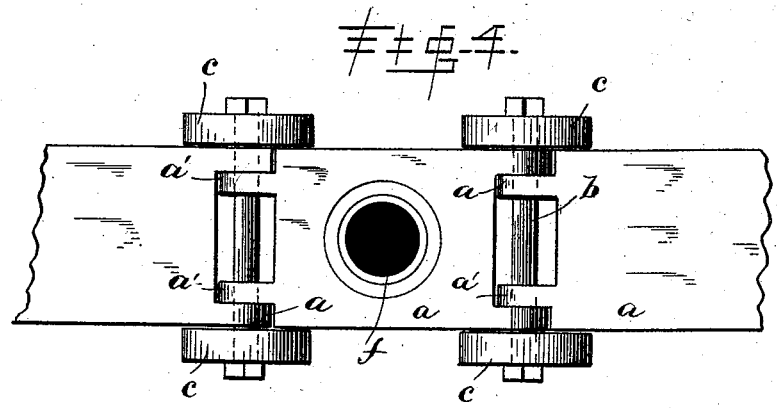
WITNESSES
INVENTOR

UNITED STATES PATENT OFFICE.

JAMES PORTER, OF GREENFIELD, MASSACHUSETTS.

PIPE-CUTTER.

SPECIFICATION forming part of Letters Patent No. 492,833, dated March 7, 1893.

Application filed May 6, 1891. Renewed May 23, 1892. Serial No. 433,978. (No model.)

*To all whom it may concern:*

Be it known that I, JAMES PORTER, a citizen of the United States of America, residing at Greenfield, in the county of Franklin and State of Massachusetts, have invented certain new and useful Improvements in Pipe-Cutters, of which the following is a specification, reference being had therein to the accompanying drawings.

My invention relates to certain improvements in pipe cutters, having for its object to provide for readily and conveniently cutting sections of pipe, in a trench or otherwise and it consists in the novel combination and arrangement of parts as hereinafter described and illustrated in the accompanying drawings and pointed out in the claims.

In the drawings Figure 1 is a front view of my pipe cutter, showing it upon a pipe. Fig. 2 is a sectional view thereof and Fig. 3 is a vertical sectional view of the same. Fig. 4 is a detail view.

In carrying out my invention I employ a belt or carriage A constructed of a series of preferably rectangular links $a$ $a$ articulated together by means of axial rods or pivots $b$ passing through apertured lugs $a'$ at the ends of said links and carrying trucks or disks $c$ upon their ends, outside of said links which travel upon the pipe. The trucks or disks are held upon the axial rods or pivots by heads or enlargements and nuts on the respective ends of the latter. The ends of the belt or carriage A thus formed are detachably connected together by an inverted C-shaped plate B pivoted at one end upon one end rod or pivot $b$, by an approximately S-shaped plate B′, its smaller terminus $b'$ serving as a hook to engage the other or opposite end rod or pivot, the two plates being connected together by a right and left handed screw C engaging corresponding threads therein. This arrangement it will be seen permits by the application of a wrench to the screw $c$ at $c'$ the contraction and expansion of the diameter of the belt or carriage according to the diameter of the pipe it is desired to fit it on for cutting. One of the links which is a split link carries a cutter D preferably of chisel shape and having a screw $d'$, formed therein, passing through and engaged by a tubular nut E to provide for varying the depth of penetration of the cutter as the cutting operation proceeds. The nut E has an inner circular or disk portion $e$ let into the split link of the belt, portion $e'$ and an intermediate tubular portion $e^2$ connecting said portion $e'$ and $e$, the inner circular or disk portion $e$ serving to prevent the displacement of the nut and yet permit of its rotation or turning. All the links except the one carrying the cutter are provided with offset or outstanding sockets $f$ to permit of the application thereto of the hand piece or knob F, and to effect the successive engagement of the links by the latter for convenience in manipulating the cutter in a trench, or otherwise.

Having thus fully described my invention, I claim—

1. A pipe cutter comprising a series of articulated links provided with sockets to receive a hand-piece and an adjustable cutter, the disks journaled on the pivots of said links, and means for connecting the end links together, substantially as described.

2. A pipe cutter comprising a series of articulated links, the pivots connecting said links, the outwardly projecting sockets, the adjustable cutter, the inverted C-shaped plate connected with one of the end links, the approximately S-shaped plate adapted to be connected with the pivot of the other end link, the right and left handed screw engaging with said plates, and the disks journaled on the pivots of said links, substantially as described.

3. A pipe cutter comprising a series of articulated links, the trucks journaled on the pivots of said links, the adjustable cutter passing through one of said links, and means for connecting the end links together and rotating the same, substantially as described.

In testimony whereof I affix my signature in presence of two witnesses.

JAMES PORTER.

Witnesses:
CHAS. F. A. EDDY,
C. H. KEITH.